(12) United States Patent
Ezick et al.

(10) Patent No.: US 9,134,976 B1
(45) Date of Patent: Sep. 15, 2015

(54) CROSS-FORMAT ANALYSIS OF SOFTWARE SYSTEMS

(75) Inventors: James Ezick, Canonsburg, PA (US); Richard A. Lethin, New York, NY (US); Jonathan Springer, Carbondale, IL (US); David E. Wohlford, Portland, OR (US)

(73) Assignee: Reservoir Labs, Inc., New York, NY (US)

( * ) Notice: Subject to any disclaimer, the term of this patent is extended or adjusted under 35 U.S.C. 154(b) by 460 days.

(21) Appl. No.: 13/324,943

(22) Filed: Dec. 13, 2011

Related U.S. Application Data (60) Provisional application No. 61/422,566, filed on Dec. 13, 2010.

(51) Int. Cl.
*G06F 9/45* (2006.01)

(52) U.S. Cl.
CPC ..................... *G06F 8/43* (2013.01)

(58) Field of Classification Search
USPC ........................................ 717/141
See application file for complete search history.

(56) References Cited

U.S. PATENT DOCUMENTS

| | | | |
|---|---|---|---|
| 5,442,699 A | 8/1995 | Arnold et al. | |
| 5,442,797 A | 8/1995 | Casavant et al. | |
| 5,488,727 A * | 1/1996 | Agrawal et al. | 717/154 |
| 5,613,136 A | 3/1997 | Casavant et al. | |
| 5,742,814 A | 4/1998 | Balasa et al. | |
| 5,920,854 A | 7/1999 | Kirsch et al. | |
| 5,953,531 A | 9/1999 | Megiddo et al. | |
| 6,006,033 A | 12/1999 | Heisch | |
| 6,018,735 A | 1/2000 | Hunter | |
| 6,038,398 A | 3/2000 | Schooler | |
| 6,131,092 A | 10/2000 | Masand | |
| 6,279,113 B1 | 8/2001 | Vaidya | |
| 6,327,699 B1 | 12/2001 | Larus et al. | |
| 6,338,057 B1 | 1/2002 | Weeks | |
| 6,651,246 B1 | 11/2003 | Archambault et al. | |
| 6,754,650 B2 | 6/2004 | Cho et al. | |
| 6,772,415 B1 | 8/2004 | Danckaert et al. | |
| 6,785,677 B1 | 8/2004 | Fritchman | |
| 6,792,546 B1 | 9/2004 | Shanklin et al. | |
| 6,880,087 B1 | 4/2005 | Carter | |
| 6,912,526 B2 | 6/2005 | Akaboshi | |
| 6,952,694 B2 | 10/2005 | Mathur et al. | |
| 6,952,821 B2 | 10/2005 | Schreiber | |
| 7,086,038 B2 | 8/2006 | Cronquist et al. | |
| 7,185,327 B2 | 2/2007 | Scales | |
| 7,225,188 B1 | 5/2007 | Gai et al. | |
| 7,260,558 B1 | 8/2007 | Cheng et al. | |
| 7,487,493 B1 * | 2/2009 | Faulkner | 717/105 |

(Continued)

OTHER PUBLICATIONS

James Ezick, "Static Analysis Tool for Interface Compliance Verification and Program Comprehension", Jan. 4, 2011, Reservoir Labs., Inc., total pp. 6.*

(Continued)

*Primary Examiner* — Marina Lee
(74) *Attorney, Agent, or Firm* — Goodwin Procter LLP (57) ABSTRACT

In various implementations of a software analysis system, compliance checking is facilitated by analyzing different characteristics of a software system to be developed, and by comparing the information extracted from these analysis. Two or more characteristics may be expressed in different formats or languages, and the descriptions of one or more of these characteristic may be incomplete.

93 Claims, 4 Drawing Sheets

(56) References Cited

U.S. PATENT DOCUMENTS

| | | | |
|---|---|---|---|
| 7,594,260 B2 | 9/2009 | Porras et al. | |
| 7,634,566 B2 | 12/2009 | Turner et al. | |
| 7,657,878 B2 * | 2/2010 | Ota | 717/143 |
| 7,757,222 B2 | 7/2010 | Liao et al. | |
| 8,087,010 B2 | 12/2011 | Eichenberger et al. | |
| 8,108,845 B2 | 1/2012 | Little et al. | |
| 8,230,408 B2 | 7/2012 | Eng | |
| 8,250,550 B2 | 8/2012 | Luszczek et al. | |
| 8,255,890 B2 | 8/2012 | Luszczek et al. | |
| 8,307,347 B2 | 11/2012 | Austin et al. | |
| 2002/0021838 A1 | 2/2002 | Richardson et al. | |
| 2003/0028364 A1 * | 2/2003 | Chan et al. | 704/1 |
| 2003/0097652 A1 | 5/2003 | Roediger et al. | |
| 2004/0034754 A1 | 2/2004 | Schreiber | |
| 2004/0068501 A1 | 4/2004 | McGoveran | |
| 2005/0114700 A1 | 5/2005 | Barrie et al. | |
| 2006/0048121 A1 | 3/2006 | Blainey et al. | |
| 2006/0048123 A1 | 3/2006 | Martin | |
| 2006/0085858 A1 | 4/2006 | Noel et al. | |
| 2007/0033367 A1 | 2/2007 | Sakarda et al. | |
| 2007/0074195 A1 | 3/2007 | Liao et al. | |
| 2007/0079299 A1 * | 4/2007 | Daly | 717/141 |
| 2007/0192861 A1 | 8/2007 | Varghese et al. | |
| 2008/0010680 A1 | 1/2008 | Cao et al. | |
| 2009/0037889 A1 | 2/2009 | Li et al. | |
| 2009/0083724 A1 | 3/2009 | Eichenberger et al. | |
| 2009/0119677 A1 | 5/2009 | Stefansson et al. | |
| 2009/0259997 A1 | 10/2009 | Grover et al. | |
| 2009/0307673 A1 | 12/2009 | Eichenberger et al. | |
| 2010/0050164 A1 | 2/2010 | Van De Waerdt et al. | |
| 2010/0162225 A1 * | 6/2010 | Huang et al. | 717/171 |
| 2011/0125798 A1 * | 5/2011 | Misch et al. | 707/785 |

OTHER PUBLICATIONS

Ahmed et al, Synthesizing Transformations for Locality Enhancement of Imperfectly-nested Loops Nests, ACM ICS 2000, pp. 141-152.
Ahmed et al, Tiling Inperfectly-nested Loop Nests, IEEE 2000,14 pgs.
Aho et al, Compilers: Principies, Techniques, & Tools, 2nd Edition, 2006, pp 173-186.
Aho et al, Efficient String Matching: An Aid to Bibliographic Search, Communications of the ACM, vol. 16, No. 6, Jun. 1975, pp. 333-340.
Aigner et al, An Overview of the SUIF2 Compiler Infrastructure, Computer Systems Laboratory, Standford University, 1999, pp. 1-14.
Aldwairi et al, Configurable String Matching Hardware for Speeding Up Intrusion Detection, ACM SIGARCH Computer Architecture News, Vo. 33, No. 1, Mar. 2005, pp. 99-107.
Allen et al, Conversion of Control Dependence to Data Dependence, ACM 1983, pp. 177-189.
Ancourt et al, Scanning Polyhedra with DO Loops, Proceedings of the third ACM SIGPLAN symposium on Principles and practice of parallel programming, Apr. 21-24, 12 pgs. 1991
Appel, A.W., Deobfuscation is in NP, Princeton University, Aug. 21, 2002, 2 pgs.
Ayers et al, Aggressive Inlining, PLDI '97 Las Vegas, NV, USA.
Ball et al, Branch Prediction for Free, Technical Report #1137, University of Wisconsin, 1993, 29 pgs.
Barak et al, On the (Im)possibility of Obfuscating Programs, Advancies in Cyrptology, CRYPTO 2001, vol. 2139, pp. 1-18.
Barthou et al, Maximal Static Expansion, International Journal of Parallel Programming, vol. 28, No. 3, 2000, 20 pgs.
Bastoul et al, Putting Polyhedral Loop Transformations to Work, INRIA, No. 4902, Jul. 2003.
Bastoul, C., Generating Loops for Scanning Polyhedra: CLooG User's Guide, First Version, Rev, 1.6, Apr. 8, 2004, pp. 1-30.
Bastoul, Code Generation in the Polyhedral Model is Easier Than You Think, Proceedings of the 13th International Conference on Parallel Architecture and Compilation Techniques, 2004.
Bastoul, Efficient Code Generation for Automatic Parallelization and Optimization, Proceedings of the Second International Symposium on Parallel and Distributed Computing, 2003.
Bednara et al, Synthesis for FPGA Implementations From Loop Algorithms, In Proceedings ofthe Int. Conf. on Engineering of Reconfigurable Systems and Algorithms (ERSA), Jun. 2001.
Berkelaar et al, The IpSolve Package, Sep. 21, 2007, pp. 1-9.
Bik et al, Implementation of Fourier-Motzkin Elimination, Technical Report 94-42, Department. of Computer Science, Leiden University, 1994.
Bondhugula et al, A Pracitcal and Fully Automatic Polyhedral Program Optimization System, OSU OSU-CISRC-10/07-TR70; Dec. 14, 2007.
Bondhugula et al, A Practical Automatic Polyhedral Parallelizer and Locality Optimizer, PDLI '08, Jun. 7-13, 2008.
Bondhugula et al, Affine Transformations for Communication Minimal Parallelization and Locality Optimization of Arbitrarily Nested Loop Sequences, OSU CSE Technical Report, OSU-CISRC-5/07/TR43, pp. 1-30.
Bondhugula et al, Automatic Mapping of Nested Loops to FPGAs, OSU, Mar. 19, 2007.
Bondhugula et al, Toward Effective Automatic Parallelization for Multi\par core Systems, In proceeding of 22nd IEEE International Symposium on Parallell and Distributed Processing, (IPDPS 2008). Miami, Florida USA, Apr. 14, 2008.
Boulet et al, (Pen)-ultimate tiling?, Laboratoire de l'Informatique du Parallelisme, Research Report No 93-96, Nov. 1993, pp. 1-17.
Boulet et al, Scanning Polyhedra without Do-loops, Parallel Architecture and Compilation Techniques, 1998, Proceedings 1998 International Conference on Oct. 12-18, 1998, pp. 4-11.
Briggs et al, Effective Partial Redundancy Elimination, Sigplan PLDI, Jun. 1994, pp. 1-12.
Brumley et al, Towards Automatic Generation of Vulnerability-Based Signatures, Proceedings of the 2006 IEEE Symposium on Security and Privacy, pp. 1-15.
Burger et al, Scaling to the End of the Silicon and EDGE Architectures, Computer, Jul. 2004, pp. 44-55.
Burke et al, Flow-Insensitive Interprocedural Alias Analysis in the Presence of Pointers, Lecture Notes in Computer Science, Proceedings from the 7the International Workshop on Languages and Compliers for Parallel Computing, vol. 892, 1995, 18 pgs.
Cifuentes, C., A Structuring Algorithm for Decompilation, XIX Conferencia Latinoamericana de Informatica, Buenos Aires, Argentina, Aug. 2-6, 1993, pp. 267-276.
Cifuentes,Structuring Decompiled Graphs, Department of Computer Science, University of Tasmania, 1994, 15 pgs.
Clauss et al, Automatic Memory Layout Transformations to Optimize Spatial Locality in Parameterized Loop Nests, ACM SIGARCH Computer Architecture News, vol. 28, No. 1, 2000, pp. 1-9.
Clauss et al, Deriving Formulae to Count Solutions to Parameterized Linear Systems using Ehrhart Polynominals: Applications to the Analysis of Nested-Loop Programs, Apr. 10, 1997.
ClearSpeed—Accelerator Technology Primer, ClearSpeed Technology Primer, ClearSpeed Technology, Inc., 2006.
ClearSpeed—ClearSpeed Programming Model: An Introduction, ClearSpeed Technology Inc. 2007.
ClearSpeed—ClearSpeed Programming Model: Card-side Libraries, ClearSpeed Technology Inc. 2007.
ClearSpeed—ClearSpeed Programming Model: Optimizing Performance, ClearSpeed Technology Inc. 2007.
ClearSPeed—CSX Processor Architecture Whitepaper, ClearSpeed Technology Plc., 2006.
ClearSpeed—Introduction to ClearSpeed Acceleration, ClearSpeed Technology Inc., 2007, 27 pages.
ClearSpeed—Introduction to ClearSpeed Acceleratin, Powerpoint Presentation, ClearSpeed Technology Plc, 2007, 133 pgs.
ClearSpeed—Overview of Architecture: System Level (host) Architecture and ClearSpeed Architecture, ClearSpeed Technology Inc., 2007.
ClearSpeed Introductory Programming Manual—The ClearSpeed Software Development Kit, ClearSpeed Technology Inc. 2007.
ClearSpeed Programming Model: Case Study, ClearSpeed Technology Inc., 2007.

(56) References Cited

OTHER PUBLICATIONS

ClearSpeed Technical Training: Software Development, ClearSpeed Technology Inc., 2007.
Click et al, A Simple Graph-Based Intermediate Representation, ACM IR'95, 1995, pp. 35-49.
Click, C., Global Code Motion Global Value Numbering, ACM SIGPLAN'95, pp. 246-257.
Collard et al, Automatic Generation of Data Parallel Code, Proceedings of the Fourth International Workshop on Compilers for Parallel Computers, Dec. 1993.
Collard et al, Fuzzy Array Dataflow Analysis, ACM Principles and Practice of Parallel Programming, PPOpp'95, Jul. 1995, 10 pgs.
Collberg et al, A Taxonomy of Obfuscating Transformations, Technical Report 148, Department of Computer Science, University of Auckland, Jul. 1997. http://www.cs.auckland.ac.nz/-Ccollberg/Research/Publications/CollbergThomborsonLow97a.
Collberg et al, Manufacturing Cheap, Resilient, and Stealthy Opaque Constructs, POPL 98, San Diego, CA 1998.
Cooper et al, Operator Strength Reduction, ACM Transactions on Programming Languages and Systems, vol. 23, No. 5, pp. 603-625, Sep. 2001.
Cooper et al, SCC-Based Value Numbering, CRPC-TR95636-S, Oct. 1995, pp. 1-12.
Cousot et al, Abstract Interpretation: A Unified Lattice Model for Static Analysis of Programs by Construction or Approximation of Fixpoints, Conference Record of the Fourth ACM Symposium on Principles of Programming Languages, Jan. 17-19, 1977, 16 pgs.
Cytron et al, Efficiently Computing Static Single Assignment Form and The Control Dependence Graph, Mar. 7, 1991, pp. 1-52.
Darte et al, Algorithm, Chapter 5: Parallelism Detection in Nested Loops, pp. 193-226.
Darte et al, Automatic parallelization based on multi-dimensional scheduling, Research Report No. 94-24, Laboratoire de l'Informatique de Parallelisme, 1994, pp. 1-34.
Darte et al, Lattice-Based Memory Allocation, ACM CASES'03, pp. 198-308, 2003.
Darte et al, Lattice-Based Memory Allocation, IEEE Transactions on Computers, vol. 54, No. 10, Oct. 2005, pp. 1242-1257.
Darte et al, Lattice-Based Memory Allocation, Research Report No. 2004-23, Apr. 2004, 1-43.
Darte et al, Revisiting the decomposition of Karp, Miller and Winograd, Parallel Processing Letters, 1995.
Ezick et al, Alef: A SAT Solver for MPI-Connected Clusters, Technical Report, Aug. 13, 2008, 21 pgs.
Featurier, Some efficient solutions to the affine scheduling problem Part I One-dimensional Time, Laboratoire MASI, Institute Blaise Pascal, Universite de Versailles St-Quentin, Apr. 23, 1993.
Feautrier et al, Solving Systems of Affine (In)Equalities: PIP's User's Guide, 4th Version, rev. 1.4, Oct. 18, 2003, pp. 1-25.
Feaurtrier, P., Array Expansion, Universite de Versailles St-Quentin, Jul. 1988, pp. 1-20.
Feautrier, P., Dataflow Analysis of Array and Scalar References, Int. J. of Parallel Programming, vol. 20, No. 1, 1991, pp. 1-37.
Feautrier, P., Parametric Integer Programming, RAIRO Operationnelle, vol. 22, Sep. 1988, pp. 1-25.
Feautrier, P., Some efficient solutions to the affine scheduling problem, Part II, Multidimensional Time, IBP/MASI, No. 92.78, 1992, pp. 1-28.
Ferrante et al, The Program Dependence Graph and Its Use in Optimization, ACM Transactions on Programming Languages and Systems, vol. 9, No. 3, Jul. 1987, pp. 319-349.
Franke et al, Compiler Transformation of Pointers to Explicit Array Accesses in DSP Applications, Institute for Computing Systems Architecture (ICSA), University of Edinburgh.
Gautam et al, The Z-Polyhedral Model, SIGPLAN Symp. on Principles and Practice of Parallel Programming, pp. 237-248, New York, NY, USA, 2007.
George et al, Iterated Register Coalescing, ACM Transactions on Programming Languages and Systems, vol. 18, No. 3, May 1996, pp. 300-324.

Ghosh et al, Cache Miss Equations: A Compiler Framework for Analyzing and Tuning Memory Behavior, ACM Transactions on Programming Languages and Systems, vol. 21, No. 4, Jul. 1999, pp. 702-745.
Griebl et al, Code Generation in the Polytope Model, pact, pp. 106, Seventh International Conference on Parallel Architectures and Compilation Techniques (PACT'98), 1998.
Griebl et al, Forward Communication Only Placements and their Use for Parallel Program Construction, University of Passau.
Grieble et al, Space-Time Mapping and Tiling: A Helpful Combination, Concurrency and Comput.: Pract. Exper. 2004, 16:221-246.
Griebl, Automatic Parallelization of Loop Programs for Distributed Memory Architectures, Fakultat fur Mathematik und Informatik, Jun. 2, 2004.
Griebl, On the Mechanical Tiling of Space-Time Mapped Loop Nests, Fakultat fur Mthemetik und Informatik, Universitat Passau, Germany.
Gu et al, Symbolic Array Dataflow Ananlysis for Array Privatization and Program Parallelization Proceedings of Supercomputing '95, pp. 1-19, 1995.
Gustafson et al, ClearSpeed—Whitepaper: Acceleraing the Intel® Math Kernel Library, ClearSpeed Technology Inc., 2006.
Heintze et al, Ultra-fast Aliasing Analysis Using CLA: A Million Lines of C Code in a Second, ACM SIGPLAN Notices, vol. 36, No. 5, 2001, 10 pgs.
Intel® QuickAssist Technology Accelerator Abstraction Layer (AAL), White Paper, Intel® Corporation, 2007, 8 pgs.
International Preliminary Report on Patentability dated Mar. 31, 2011 for PCT Application No. PCT/US2009/057194.
International Preliminary Report on Patentability dated Oct. 27, 2011 for PCT Application No. PCT/US2010/031524.
International Preliminary Report on Patentability dated Jan. 6, 2009 for PCT Application No. PCT/US2007/72260.
International Preliminary Report on Patentability dated Nov. 1, 2011 for PCT Application No. PCT/US2010/033049.
International Search Report and the Written Opinion dated Jan. 17, 2008 for PCT Application No. PCT/US2007/72260.
International Search Report and the Written Opinion dated Mar. 18, 2010 for PCT Application No. PCT/US2009/057194.
International Search Report and the Written Opinion dated Nov. 26, 2010 for PCT Application No. PCT/US2010/031524.
International Search Report and the Written Opinion dated Dec. 1, 2010 for PCT Application No. PCT/US2010/033049.
Irigoin et al, Supernode Partitioning, Proceedings of the 15th Annual ACM SIGACT-SIGPLAN Symposium on Principles of Programming Languages, San Diego, CA, Jan. 1988.
JGAP Frequently Asked Questions, Sourceforge.net, pp. 1-61.
Jimenez et al, Register Tiling in Nonrectangular Iteration Spaces, ACM Transacions on Programming Languages and Systems, vol. 24, No. 4, pp. 409-453, Jul. 2002.
Kandemir et al, Optimizing Spatial Locality in Loop Nests using Linear Algebra, Proc. 7th International Workshop on Compliers for Parallel Computers, Sweden Jun. 1998.
Kelly et al, Code Generation for Multiple Mappings, frontiers, Fifth Symposium on the Frontiers of Massively Parallel Computation (Frontiers '95), 1995, pp. 1-11.
Kelly, W. A., Ph.D. Dissertation, Optimization within a Unified Transformation Framework, Dec. 8, 1996, pp. 1-89.
Kildall, G.A., A Unified Approach to Global Program Optimization, Annual Symposium on Principles of Programming Languages, Proceedings of the 1st annual ACM SIGACT-SIGPLAN symposium on Principles of programming languages, pp. 194-206, 1973.
Knoop et al, Partial Dead Code Elimination. Conference on Programming Language Design and Implementation, Proceedings of the ACM SIGPLAN 1994 conference on Programming language design and implementation, pp. 147-158, 1994.
Kodukula et al, An Experimental Evaluation of Tilling and Shacking for Memory Hierarchy Management, ACM ICS'99, 1999, pp. 482-491.
Lam, M., Software Pipeline: An Effective Scheduling Technique for VLIW Machines, Proceedings of the SIGPLAN '88 Conference on Programming Language Design and Implementation, Jun. 22-24, 1988, pp. 318-328.

(56) References Cited

OTHER PUBLICATIONS

Landi, W. Undecidability of Static Analysis, From ACM Letters on Programming Languages and Systems, vol. 1, No. 4, 1992, pp. 1-17.
Le Verge, H., A Note on Chernikova's Algorithm, Research Report, Jul. 27, 1994, pp. 1-25.
Lengauer et al, A Fast Algorithm for Finding Dominators in a Flowgraph. ACM Transaction on Programming Languages and Systems, vol. 1, No. 1, Jul. 1979, pp. 121-141.
Lethin et al, Mapping Loops for the ClearSpeed Processor Using the R-Stream Compiler, Feb. 4, 2008.
Lethin et al, R-Stream: A Parametric High Level Compiler, Reservoir Labs, Inc., 2 pgs.
Lethin et al, The R-Stream 3.0 Compiler, Dec. 18, 2007.
Lethin et al, The R-Stream 3.0 Compiler, Feb. 4, 2008.
Lethin et al, The R-Stream 3.0: Polyheadral Mapper, XPCA Review, Feb. 6, 2007.
Lethin, Software Tools to Optimize BMD Radar Algorithms to COTS Hardware—Final Report, Sep. 12, 2007.
Lim et al, Blocking and Array Contraction Across Arbitrarily Nested Loops Using Affine Partitioning, ACM PPOPP'01, 2001, pp. 1-10.
Lim et al, Maximizing Parallelism and Minimizing Synchronization with Affine Transforms, 24th Annual ACM SIGPLAN-SIGACT Symposium on Principles of Programming Languages, Paris France, Jan. 1997.
Loechner et al, Precise Data Locality Optimization of Nested Loops, The Journal of Supercomputing, 21, pp. 37-76, 2002.
Maydan et al, Array Data-Flow Analysis and its Use in Array Privatization, ACM-20th PoPL-1, 1993, pp. 2-15.
McWhirter et al, Normalised Givens Rotations for Recursive Least Squares Processing, VLSI Signal Processing, VIII, 1995. IEEE Signal Processing Society [Workshop on], 1995, pp. 323-332.
Megiddo et al, Optimal Weighted Loop Fusion for Parallel Programs, ACM Symposium on Parallel Algorithms and Architectures archive Proceedings of the ninth annual ACM symposium on Parallel algorithms and architectures, pp. 282-291, 1997.
Meister et al, Optimizing and Mapping Tool Chain for FPGA Programming—Final Report Phase 1 SBIR Project, Sep. 28, 2007.
Meister et al, Static Software Tools to Optimize BMD Radar Algorithms to COTS Hardware, Quarterly Report #1, 2008, pp. 1-22.
Meister, B. Stating and Manipulating Periodicity in the Polytope Model. Applications to Program Analysis and Optimization, Universite Louis Pasteur Strasbourg, 2004, pp. 1-138.
Nookala et al, A Library for Z-Polyhedral Operatoins, Publication Interne No. 1330, IRISA, Publications No. 1330, May 2000, pp. 1-29.
Pop et al, Fast Recognition of Scalar Evolutions on Three-Address SSA Code, CRI/ENSMP Research Report, A/354/CRI, Apr. 1, 2004.
Pop et al, Induction Variable Analysis with Delayed Abstractions, ACM Transactions on Architecture and Code Optimization, vol. V, No. N, pp. 1-30, Aug. 2005.
Pugh, W. The Omega Test: a fast and practical integer programming algorithm for dependence analysis, ACM, Aug. 1992, pp. 1-19.
Quillere et al, Generation of Efficient Nested Loops from Polyhedra, 2000 Kluwer Academic Publishers, 2000.
Quillere et al, On Code-Generation in the Polyhedral Model, 10 pgs.
Quinton et al, On Manipulating Z-polyhedra, IRISA, Publication Interne No. 1016, Jul. 1996.
Quinton et al, The Mapping of Linear Recurrence Equations on Regular Arrays, Journal of VLSI Signal Processing, vol. 1, 35 pgs. (1989).
Rabinkin et al, Adaptive Array Beamforming with Fixed-Point Arithmetic Matrix Inversion using Givens Rotations, Proc. SPIE vol. 4474, 2001, pp. 294-305.
Rau, B. R., Iterative Modulo scheduling: An Algorithm for Software Pipelining Loops, ACM MICRO, 1994, pp. 63-74.
Reconfigurable Application-Specific Computing User's Guide, 2007, pp. 1-257.
Renganarayana, et al, A Geometric Programming Framework for Optimal Multi-Level Tiling, Conference on High Performance Networking and Computing, Proceedings of the 2004 ACM/IEEE conference on Supercomputing, 2004, 14 pgs.
Reservoir Labs, Inc., Optimizing and Mapping Tool Chain for FPGA Programming, Phase II Proposal, Proposal No. D2-0627, 40 pgs.
Reservoir Labs, Software Tools to Optimize BMD Radar Algorithms to COTS Hardware: Phase II Proposal, Topic No. MDA06-031, Proposal No. B2-1415.
Ros-Giralt et al, Generation of High-Performance Protocol-Aware Analyzers with Applications in Intrusion Detection Systems, Reservoir Labs, 8 pgs.
Ros-Girolt et al, Compilation and Optimization of Protocol Analyzers for High-Speed Network Intrusion Prevention, High Performance Networks / High-Speed Network Security Systems, Topic No. 41b, Reservoir Labs, Inc. 2009, pp. 1-54.
Sankaralingam et al, Distributed Microarchitectural Protocols in the TRIPS Prototype Processor, International Symposium on Microarchitecture, Proceedings of the 39th Annual IEEE/ACM International Symposium on Microarchitecture, 2006, 12 pgs.
Schreiber et al, Near-Optimal Allocation of Local Memory Arrays, HP Laboratories Palo Alto, HPL-2004-24, Feb. 17, 2004.
Schwartz et al, VSIPL 1.1 API, 2002, pp. 1-739.
Seghir et al, Counting Points in Integer Affine Transformation of Parametric Z-polytopes, Research report, Universite Louis Pasteur, LSIIT (UMR CNRS 7005), Mar. 2007, pp. 1-24.
Seghir et al, Memory Optimization by Counting Points in Integer Transformation of Parametric Polytopes, ACM CASES'06, 2006, pp. 74-82.
Simpson, L. T., Thesis, Value-Driven Redundancy Elimination, Rice University, 1996, pp. 1-150.
Song et al, A Compiler Framework for Tiling Imperfectly-Nested Loops, Languages and Compilers for Parallel Computing, vol. 1863, 2000, pp. 1-17.
Springer et al, An Architecture for Software Obfuscation—Final Technical Report for Phase 1 SBIR, Jul. 30, 2007.
Springer et al, An Architecture for Software Obfuscation, PowerPoint presentation, 2007.
The Cell Roadmap, Published on PPCNUX at http://www.ppcnux.com/?q=print/6666.
The Polylib Team, Polylib User's Manual, Apr. 24, 2002, pp. 1-44.
Touati et a, Early Control of Register Pressure for Software Pipelined Loops, In Proceedings of the International Conference on Compiler Construction (CC), Warsaw, Poland, Apr. 2003, Springer-Verlag, 15 pgs.
Tu et al, Automatic Array Privatization, Lecture Notes in Computer Science, vol. 1808, 2001, 22 pgs.
Tu, P., Thesis, Automatic Array Privatization and Demand-Driven Symbolic Analysis, University of Illinois, 1995, pp. 1-144.
Udupa et al, Deobfuscation—Reverse Engineering Obfuscated Code, Proceedings of the 12th Working Conference on Reverse Engineering (WCRE'05), 10 pgs, 2005.
Vangal et al, An 80-Tile 1.28TFLOPS Network-on-Chip in 65Nm CMOS, ISSCC 2007, Session 5, Microprocessors/5.2, 3 pgs.
Vasilache et al, Alef: A SAT Solver for MPI-Connected Clusters, Reservoir Labs, 6 pgs.
Vasilache et al, Polyhedral Code Generation in the Real World, Compiler Construction, vol. 3923, 2006, 15 pgs.
Vasilache, Scalable Program Optimization Techniques in the Polyhedral Model, Thesis, Universite de Paris-SUD, UFR Scientifique d'orsay Inria Futures, Sep. 28, 2007.
Verdoolaege et al, Counting Integer Points in Parametric Polytopes using Barvinkok's Rational Functions, Algorithmica, 2007, pp. 1-33.
Wang, C., Dissertation—A Security Architecture for Survivability Mechanisms, University of Virginia, 2000, pp. 1-209.
Wegman et al, Constant Propagation with Conditional Branches, ACM Transactions on Programming Languages and Systems, vol. 13, No. 2, Apr. 1991, pp. 181-210.
Weise et al, Value Dependence Graphs: Representation Without Taxation, Annual Symposium on Principles of Programming Languages, Proceedings of the 21st ACM SIGPLAN-SIGACT symposium on Principles of programming languages, 1994, 14 pgs.
Whaley et al, An Efficient Inclusion-Based Points-To Analysis for Strictly-Typed Languages, Lecture Notes in Computer Science, vol. 2477, 2002, 16 pgs.
Wilde, D. K., A Library for Doing Polyhedral Operations, IRISA, Publication No. 785, 1993, pp. 1-48.

(56) References Cited

OTHER PUBLICATIONS

Wolf et al, A Data Locality Optimizing Algorithm, Proceedings of the ACM SIGPLAN '91 Conference on Programming Language Design and Implementation, Jun. 26-28, 1991, pp. 30-44.
Wu et al, Static Branch Frequency and Program Profile Ananlysis, 27th IEEE/ACM International Symposium on Microarchitecture (MICRO-27), 1994, 11 pgs.
Xue et al, Enabling Loop Fusion and Tilling for Cache Performance by Fixing Fusion-Preventing Data Dependences, Proceedings of the 2005 International Conference on Parallel Processing (ICPP'05), 2005, pp. 1-9.
Xue, On Tiling as a Loop Transformation, Department of Mathematics, Statistics and Computing Science, University of New England, Australia, 15 pgs.
Aloul et al, Solution and Optimization of Systems of Pseudo-Boolean Consraints, IEEE Transactions on Computers, vol. 56, No. 10, Oct. 2007, pp. 1415-1424.
Buluc et al, Parallel Sparse Matrix-Matrix Multiplication and Indexing: Implementation and Experiments, SIAM Journal of Scientific Computing (SISC), 2012.
Chang et al, Parallel sparse supports for array intrinsic functions of Fortran 90, J. Supercomput. 18(3):305-339, (2001).
Davis, Direct Methods for Sparse Linear Systems. SIAM, 2006 (100 pgs.).
Franzie et al, Effcient Solving of Large Non-linear Arithmetic Constraint Systems with Complex Boolean Structure, JSAT, Journal on Satisfiability, Boolean Modelling and Computation, vol. 1 (3-4): 2007, pp. 209-236.
Gundersen et al, Sparsity in higher order methods for unconstrained optimization, Optimization Methods and Software, 27(2):275-294 (2012).
Gustavson, Two Fast Algorithms for Sparse Matrices: Multiplication and Permuted Transposition, ACM Transactions on Mathematical Software, 4(3): 250-269, 1978.
Kolda et al, Scalable Tensor Decompositions for Multiaspect Data Mining, in ICDM 2008: Proceedings of the 8th IEEE International Conference on Data Mining, Dec. 2008, pp. 363-372.
Lathauwer et al, On the Best Rank-1 and Rank-$(R_1,R_2, \ldots ,R_N)$ Approximation of Higher-Order Tensors, SIAM J. Matrix Anal., Appl., 21:1324-1342, Mar. 2000.
Lin et al, Efficient data compression methods for multidimensional sparse array operations based on the EKMR scheme, IEEE Trans. Comput. 52(12):1640-1646, (2003).
Lin et al, Efficient Representation Scheme for Multidimensional Array Operations, IEEE Transactions on Computers, 51:327-345, 2002.
Nieuwenhuis, Solving SAT and SAT Modulo Theories: From an Abstract Davis-Putnam-Logemann-Loveland Procedure to DPLL(T), Journal of the ACM (JACM) JACM vol. 53 Issue 6, Nov. 2006, pp. 937-977.
Vera et al, An Accurate Cost Model for Guiding Data Locality Transformations—Politecnica de Catalunya—Barcelona Universit—Sep. 2005.
Jonsson et al., "Verifying Safety Properties of a Class of Infinite-State Distributed Algorithms", Lecture Notes in Computer Science, 1995, vol. 939, pp. 42-53.
Mahajan et al., "Zchaff2004: An Efficient SAT Solver", LNCS, 2005, pp. 360-375.

* cited by examiner

CROSS-FORMAT ANALYSIS OF SOFTWARE SYSTEMS

CROSS-REFERENCE TO RELATED APPLICATIONS

This application claims priority to and the benefit of U.S. Provisional Patent Application No. 61/422,566, filed on Dec. 13, 2010, which is incorporated herein by reference in its entirety.

GOVERNMENT INTERESTS

This invention was made with Government support under contract no. N00039-09-C-0118 awarded by the U.S. Navy/SPAWAR. The Government has certain rights in the invention.

FIELD OF THE INVENTION

The technology disclosed herein relates generally to systems and methods for software analysis, and in particular to systems and methods for software testing.

BACKGROUND

As the use of computer-based software systems and applications proliferates in areas as diverse as home use and entertainment/recreation, scientific and business computing, communications, and medical and military applications, there is an increasing demand to produce high-quality software in a timely and cost-effective manner. Errors in software can cause costly product delays and may jeopardize privacy and/or safety of the users of the software in certain situations, for example, in the case of software used in financial, medical, and/or military systems. Therefore, significant emphasis is usually given to software testing and quality assurance of software.

One aspect of software testing is compliance checking in which various requirements of a software system are typically specified in a human and/or computer-readable specification document. Such requirements include, for example, a set of functionalities (also called capabilities) the software is expected to deliver, certain special situations the software should be able to handle, and certain interfaces the software should provide, possibly to facilitate interaction with other software systems. Accordingly, compliance checking generally includes ascertaining that the functionalities described in the specification document are, in fact, provided by the software and/or various constraints, if listed in the specification document, are not violated by the software. Compliance checking may also include verifying that the functionalities provided by the software are consistent with the software architecture that describes various components of the software, and interactions among those components. In addition, compliance checking may include verifying that any supplemental configuration associated with the software, e.g., a listing of interfaces provided by the software, conforms to the requirements described in the specification document, and/or verifying that the supplemental configuration is consistent with the functionalities provided by the software and/or the software architecture.

Compliance checking can be performed once the software is ready for execution, i.e., the source code thereof has been written and compiled into a computer readable executable code. If an error is discovered during such a test, e.g., if a functionality provided is found not to be in accordance with a requirement in the specification document, the source code of the software may be modified and recompiled to obtain a modified executable code that must be retested. This testing methodology is often time consuming and costly. Moreover, to obtain a fully executable software system, the source code of all components of the software must be implemented, e.g., written by a developer, obtained from other sources, generated using a computer, etc. Awaiting implementation of all software components can add a significant delay to the overall development of the software.

In addition, in some situations, certain components of the complete software system are not available to a developer. It is not uncommon that a user of a software system may obtain some components from a developer, and generate certain other components on its own or may obtain them from a third-party vendor. Those other components may not be available to the developer, even in an executable form, typically for reasons such as those other components are the software user's proprietary, confidential property that the user may not share, or because obtaining a license from the third-party vendor is costly. In this situation, the user of the software typically specifies several requirements for the components to be supplied by the developer so that the user can integrate the various components into a complete software system. The developer is typically required to test and assure compliance of the components to be supplied by the developer with the specified requirements, even though the developer does not have access to all components of the software and, hence, cannot build a complete executable software for testing thereof.

According to some static-analysis techniques (i.e., techniques for testing a source-code implementation of a software system) various errors, including violations of some general implementation guidelines, can be detected early in a software development cycle. Thus, static analysis can avoid significant delays and costs associated with detecting these errors/violations for the first time while testing the executable software. Many static-analysis techniques, however, present some challenges to the use thereof for compliance checking.

As described above, static analysis is usually performed on the software source-code, which is typically written using a single programming language such as C, C++, JAVA™, etc. As such, many static-analysis tools are language specific, i.e., they are designed to analyze code written in only one format or language. In compliance checking, however, the software architecture (e.g., a high level description of various components of the software, and interactions among those components) may be provided in one format, e.g., plain text, Extensible Markup Language (XML), etc., while the source-code may be written in a different format/language such as C, C++, JAVA™, etc. Moreover, one part of the source code may be written in one format/language and another part may be written in a different format/language. Therefore, those static-analysis tools cannot ascertain that the requirements according to a high-level architecture specified in one format are met by an implementation described in one or more different formats. This problem may be compounded if the supplemental configuration associated with the software, such as interfaces to other components to be provided, is described in a third format.

Some known static-analysis tools may be used to test partially implemented source code, but these tools generally require at least some information about the incomplete or unavailable portions of the source code and/or components of the system. Such information is often provided in files commonly known as header files. The header files are not available, however, when certain proprietary and/or third-partysupplied components are inaccessible to the developer, as described above. As such, in various situations described above, known static analysis techniques cannot be employed effectively for compliance checking.

SUMMARY

In various provided embodiments, systems and methods of cross-format analysis of software systems enable testing, and compliance checking in particular, of a software system being developed early in the development cycle, i.e. at the source-code level, even if one or more of the software architecture, source code, and the associated configuration to be provided with the software are expressed in different formats/languages. The cross-format analysis systems and methods can perform the testing as described above even if some components are only partially developed and even if no information is available for some components.

This is achieved, in part, by analyzing the software requirements described in one or more files of a certain format/language, and by extracting and representing those requirements in an intermediate format. Then, the source-code files, in another format/language, which may provide a full or incomplete implementation of the software system are analyzed and various functionalities that are implemented at the time of analysis are extracted. These extracted functionalities are compared with the requirements listed in the intermediate format, and discrepancies, if any, are identified.

Any supplemental configuration that may include, for example, interfaces for inter-operability with other components of the software being developed, or a different software system, is similarly analyzed and the information obtained from that analysis is compared with the extracted requirements, the extracted functionalities, or both. The supplemental configuration may also be only partially complete. The order of analysis described above is merely exemplary and not a required one. In general, depending on the type of testing to be performed, a suitable order of analyses can be selected. For example, in some situations, the source-code implementation may be analyzed first and then the software architecture may be analyzed, checking, for example, whether an implemented functionality as extracted from the source-code analysis is permitted according to the software architecture and/or the software specification.

In this way, it can be ascertained that different characteristics of the software being developed, e.g., the software architecture/requirements, provided functionalities, provided supplemental configuration, etc., are all consistent with one another. Thus, various provided embodiments of cross-format analysis enable compliance checking at the source-code level regardless the format/language of the software characteristics, thereby allowing for detection of errors early which, in turn, can reduce the cost of software development. Moreover, the cross-format analysis according to various provided embodiments facilitates compliance checking even if no information is available about certain components of the software.

Accordingly, in one aspect, a computer-implemented method, an apparatus including a processor and a memory including processor executable instructions that, when executed by the processor, configure the apparatus, and/or an article of manufacture including a non-transitory machine-readable medium storing instructions that, when executed by a machine, configure the machine are provided to read, in the memory, a first module describing a first characteristic of the software application. At least a part of the first module has a first format. The method and/or instructions in the apparatus and/or the article are also provided to read, in the memory, a second module describing a second characteristic of the software application. At least a part of the second module has a second format that is different from the first format.

The method and/or instructions in the apparatus and/or the article are also provided to analyze, by the processor, the first module to express at least a portion of the first characteristic as a first artifact, and to analyze, by the processor, the second module to derive at least a portion of the second characteristic. In addition, the method and/or instructions in the apparatus and/or the article are provided to compare, by the processor, the first artifact and the derived portion of the second characteristic to determine if the at least a portion of the first characteristic, as expressed by the first artifact, is consistent with the derived portion of the second characteristic, and to store, in one or both of the memory and a nonvolatile storage, a result of the comparison as a second artifact.

In some provided embodiments, the first format includes one or more of plain text, Extensible Markup Language (XML), JAVASCRIPT™ Object Notation (JSON), and Unified Modeling Language (UML). The first module may include one or more files. The first characteristic described by the first module may include a partial and/or entire software architecture describing a functionality to be provided by the software application. The first artifact may include one or more application-program-interfaces (APIs) corresponding to the partial and/or entire software architecture.

In some provided embodiments, the second format includes one or more of Interface Description Language (IDL), Simple Declarative Language (SDL), and proprietary distributed Component Object Model (DCOM), and the second module may include one or more files. The second characteristic described by the second module may include a software configuration associated with the software application. The software configuration may be expressed as one or more APIs corresponding to the partial and/or entire software architecture describing of the functionality to be provided by the software application. The second artifact may include a portion of the first artifact that is consistent with the derived portion of the second characteristic and/or a portion of the first artifact that is not consistent with the derived portion of the second characteristic.

In some provided embodiments, the second artifact includes at least a portion of a third characteristic of the software application, and the third characteristic may include partial and/or entire source-code implementation of the software application. The language of the source-code implementation may be one or more of C, C++, JAVA™, Fortran, and Ada. The portion of the third characteristic or the entire third characteristic of the software application may include one or more API function declarations. The one or more of the API function declarations may include at least one of a function name, a function argument, and a function return type.

In some provided embodiments, the processor is further configured to read, in the memory, a third module comprising a file describing a part of a third characteristic of the software application. At least a part of the file has a third format. The processor may also be configured to analyze, by the processor, the file to derive at least a portion of the third characteristic, that corresponds to the file, from the part of the third characteristic described in the file, and to compare, by the processor, the second artifact and the derived portion corresponding to the file to determine if the derived portion corresponding to the file is consistent with the second artifact. The processor may be further configured to store, in the at least one of the memory and the nonvolatile storage, a result of the comparison of the second artifact and the derived portion corresponding to the file as a report corresponding to the analyzed file. The third format may include one or more source-code languages. One of the source-code languages may be one of C, C++, JAVA™, Fortran, and Ada.

In some provided embodiments, the part of the third characteristic described by the file comprises at least a portion of a source-code implementation of the software application. The report corresponding to the file may include a portion of the second artifact that is consistent with the derived portion of the third characteristic corresponding to the file, or a portion of the second artifact that is not consistent with the derived portion of the third characteristic corresponding to the file. The derived portion corresponding to the file may include one or more API function declarations corresponding to at least a partial source-code implementation of the software application. The second artifact may include one or more API function declarations.

In some provided embodiments, the third module includes several files, each file describing a part of a third characteristic of the software application. The processor may be configured to repeat analyzing, comparing, and storing for each file in the third module, thereby generating a number of reports, each report corresponding to one file. The second artifact comprises a set of requirements, and the processor is further configured to combine the report corresponding to each file to generate a combined report. The processor may also be configured to analyze the combined report to determine if each requirement in the set is satisfied exactly once.

In some provided embodiments, the second artifact includes a set of requirements, and the method and/or configuration of the processor to compare comprises a further configuration of the processor to annotate a requirement in the set if the requirement determined to correspond to the derived portion corresponding to the file. The configuration to annotate the requirement may include a further configuration of the processor to lock the requirement in the second artifact. The locking can avoid simultaneous updates to a requirement if comparing the second artifact and the derived portion corresponding to the file is performed simultaneously with another comparison, comparing the second artifact and a derived portion corresponding to another file.

In some provided embodiments, several characteristics are associated with the software application, and the method further provides and/or the processors, according to the instructions, is further configured to select a test to be performed to determine consistency. The method may also include and/or the processor may be further configured to designate, based on the selected test, one characteristic from the several characteristics as the first characteristic, and a another, different characteristic from the several characteristics as the second characteristic. The selected test to be performed may be exception consistency, and the characteristic designated as the first characteristic may include at least a portion of a source-code implementation of the software application. The characteristic designated as the second characteristic may include at least a partial software architecture describing one or more functionalities to be provided by the software application. The second artifact, the report, or both may include a line identifier for a line in a file in at least one of the first, second, and third modules, the identified line being inconsistent with a software specification.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various provided embodiments of the present invention are described with reference to the following drawings, in which.

DETAILED DESCRIPTION

Cross-testing generally refers to a technique for statically (e.g., at the source-code level) analyzing a mixed-format corpus of files (e.g., CORBA® Interface Description Language (IDL), XML, and programming language source code) belonging to a common project against a specification containing rules for imposing consistency across the information represented by the different files. An objective of cross-testing is to test and verify requirements, such as consistency requirements, that cannot be completely checked by examining the files of only one type. In general, cross testing includes parsing files of each type separately, distilling the information relevant to consistency testing into a queryable intermediate format, the distilled information forming a common base of knowledge, and then testing each requirement by analyzing the common base of knowledge.

To this end, an exemplary cross-format analysis system includes a separate parser and information extractor/generator for each file format associated with a software-development project. The cross-format system also includes an analyzer for analyzing, e.g., by comparing, matching, etc., the extracted/generated information corresponding to the different formats. That analysis is used to check consistency, for example, between an architecture of the software in one format and the implementation of the software in another format.

An exemplary cross-format analysis system analyzes source-code files in C and/or C++ languages using a parser. Various commercially available parsers can be used for this purpose. An output of the parser representing the source code is broken down into a documented set of data structures that can be queried and/or processed with respect to one or more software architecture/specification requirements. From this processing and analysis, a report that includes all the relevant information and documents the test performance is produced. The report may also relate (e.g., cross reference) any incidents of discrepancies between the software architecture and the source-code implementation to the corresponding text of the source code.

Figure 1:
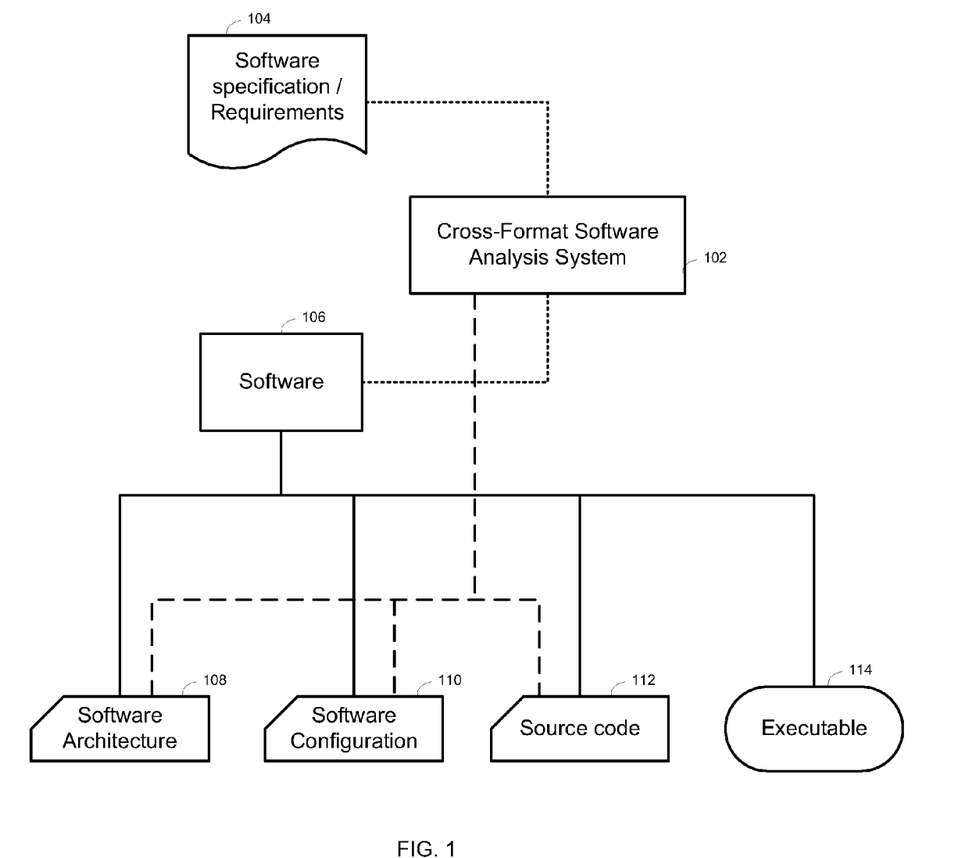
FIG. 1 schematically depicts various characteristics of a developed software or software to be developed, and cross-format analysis according to one provided embodiment.

With reference to FIG. 1, a cross-format software analysis system 102 receives software specification 104 describing the requirements of the software 106 to be implemented. These requirements may include certain functionalities that must be implemented in the software 106, and certain functions provided by other components (e.g., proprietary and/or third-party components) that must be invoked and/or cannot be invoked. Associated with the software 106 is a software architecture 108, a software configuration 110, a source-code implementation 112 and an executable 114. The cross-format software analysis system 102 reads and analyzes the software architecture 108, a software configuration 110, a source-code implementation 112 for consistency thereof with one another.

The specification 104 may require that the configuration 110 be supplied as a part of software 106. The configuration 110, for example, may include interfaces to various functionalities provided in the software 106, thereby facilitating convenient integration of the software 106 with other software components and/or systems. In general, the software architecture 108, the configuration 110, and the source code 112 can be viewed as various characteristics (or properties) of the software 106. Each of these characteristics can be expressed in a different format, and parts of the same characteristic, for example different source files of the source code 108 may also be expressed in different formats.

Figure 2:
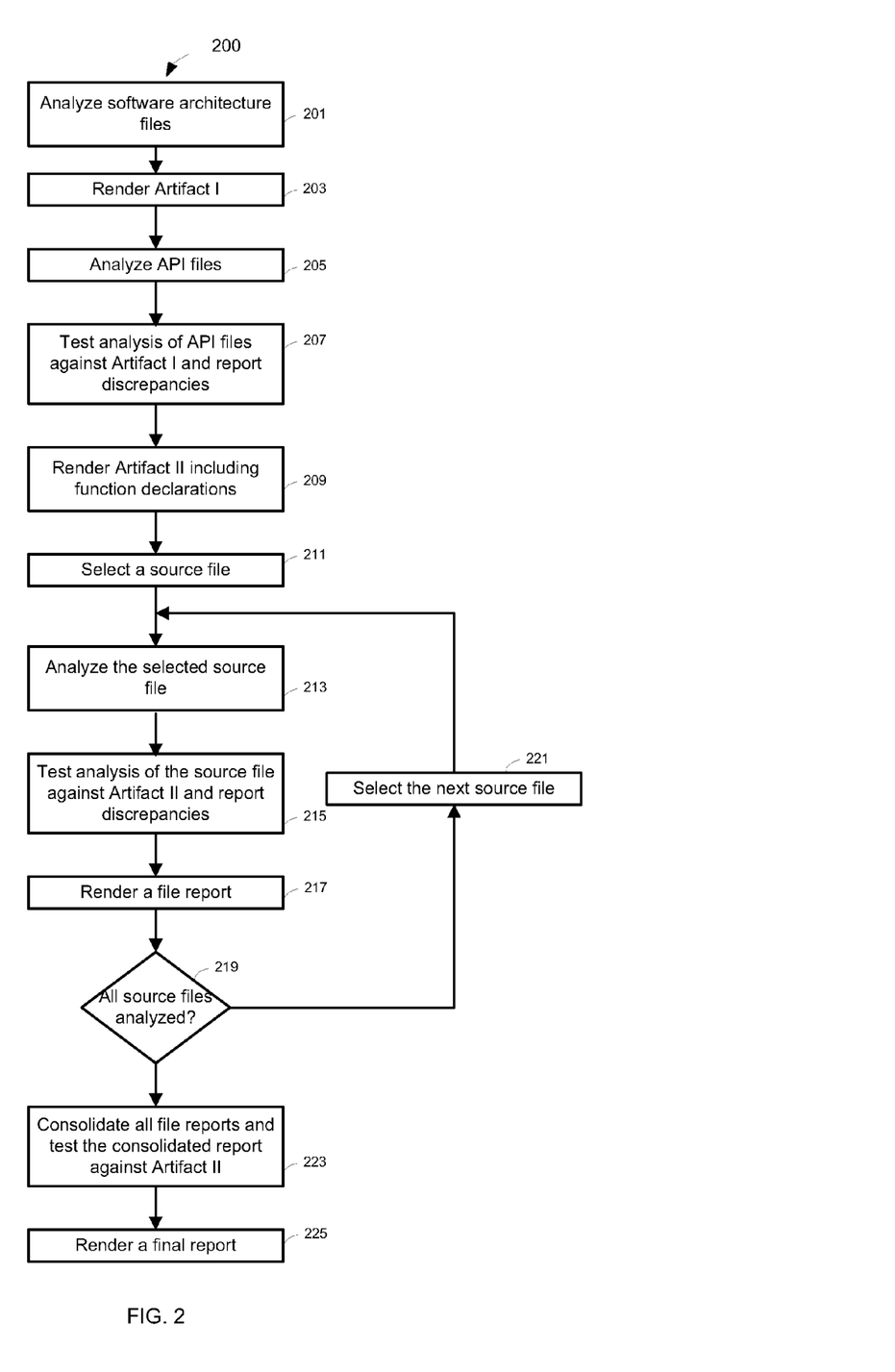
FIG. 2 illustrates a process of performing compliance checking in accordance with one provided embodiment.

With reference to FIG. 2, in a compliance testing process 200, a description module describing/specifying the requirements of the software to be developed is analyzed in step 201. The description module includes one or more files in the XML format. In other provided embodiments, the files of the descriptor module can be in various other formats such as plain text, JSON, UML, etc. In step 201, the XML descriptor files corresponding to the software architecture are statically analyzed to determine a functionality (also called capability) set. The functionality set identifies the various functionalities the software is required to provide.

This functionality/capability set is rendered into an Artifact I in step 203. For example, the Artifact I may include or consist essentially of a list of application-program interfaces (APIs) corresponding to the capabilities described. The steps 201, 203 may be performed even if the descriptor module is incomplete, i.e., some descriptor files have not been provided and/or one or more descriptor files may be updated at a later time to include additional requirements. At the time of performance of steps 201, 203, a list of APIs is built from the requirement information that is available at that time.

In one provided embodiment, the specification of the software requires that each functionality provided by the software be expressed as an API in an interface module as supplemental configuration associated with the software. The specification further requires that the format of the APIs be IDL. It should be understood, however, that the supplemental configuration associated with the software may be described in other formats such as SDL, proprietary DCOM, etc. As such, in step 205, the interface module that includes various API files in the IDL format is analyzed. During this analysis, a list of APIs corresponding to the functionalities purportedly provided by the software is derived from the IDL files.

The list of APIs derived in step 205 is compared with the Artifact I, which contains the list of API that the software is required to be provide, in step 207. If these two lists do not match, the supplemental configuration includes APIs corresponding to functionalities that are not required, or the supplemental configuration lacks the APIs corresponding to the functionalities that are, or both. Such discrepancies, if any, and indicating that the supplemental configuration does not comply with the specified requirements of the software, are reported in the step 207.

In step 209, the information derived from the API files and that extracted from the descriptor files and rendered into Artifact I is processed to facilitate further compliance analysis. Specifically, the APIs for which no discrepancies were found in step 207, a corresponding list of function declarations, including function names, arguments, and return types, that is expected to be provided in the source code of the software is generated and rendered as Artifact II in step 209. Artifact If may also include any discrepancies identified in step 207.

In step 211, one of the source files of the software being developed (or already developed) is selected. The format of these source files can be C, C++, JAVA™ Fortran, Ada, etc. In some provided embodiments, all source files available at the time of analysis may be described using one format/language, while in other provided embodiments, some source files may be described in one format/language (e.g., C++) while the other source files may be described in another format/language (e.g., Ada). It should be understood that the combination of C++ and Ada files described herein is illustrative only, and that combinations of source files in other formats and combinations including more than two different formats (e.g., three or five different formats) are within the scope of the present invention. The selected source file is analyzed in step 213, and one or more function declarations, each one having a corresponding function that implements a certain functionality/capability, are identified from the source code contained in that file.

In step 215, the identified function declarations are compared with the function declarations rendered into Artifact II. Recall, the function declarations in Artifact II are based on the specified requirements and the documented APIs that were determined to be in compliance with the specified requirements. Therefore, if the identified function declarations match with those in Artifact II, it may be concluded that the part of the source-code implementation contained in the analyzed file is in compliance with both the software architecture and the supplemental configuration. If, however, a discrepancy is found, for example with respect to the number and/or types of arguments and/or return type, that discrepancy is reported in step 215.

Based on the above analysis, in step 217, a report is generated and rendered that includes all of the functions rendered in Artifact II that are also defined with the scope of the analyzed file, whether or not any discrepancies exists, i.e., whether or not the source-code implementation conforms to the specified requirements and/or the documented APIs.

Whether all source files have been analyzed is checked in step 219 and, if one or more files remain to be analyzed, the next source file is selected in step 221, and steps 213-219 are repeated. When all files are analyzed, the file reports, each one corresponding to a source-code file, are consolidated (e.g., merged), in step 223. Also in step 223, the consolidated report is compared with Artifact II, so as to ascertain that among all available source files, each functionality, as specified in the descriptor module, is implemented exactly one in some source-code file. Any discrepancies, such as a required functionality was not found in any available source-code file, or a required functionality was implemented more than once in the source code, are also analyzed in step 223. A final report, including results of various analyses and comparisons, and any discrepancies identified, is rendered in step 225.

Figure 3:
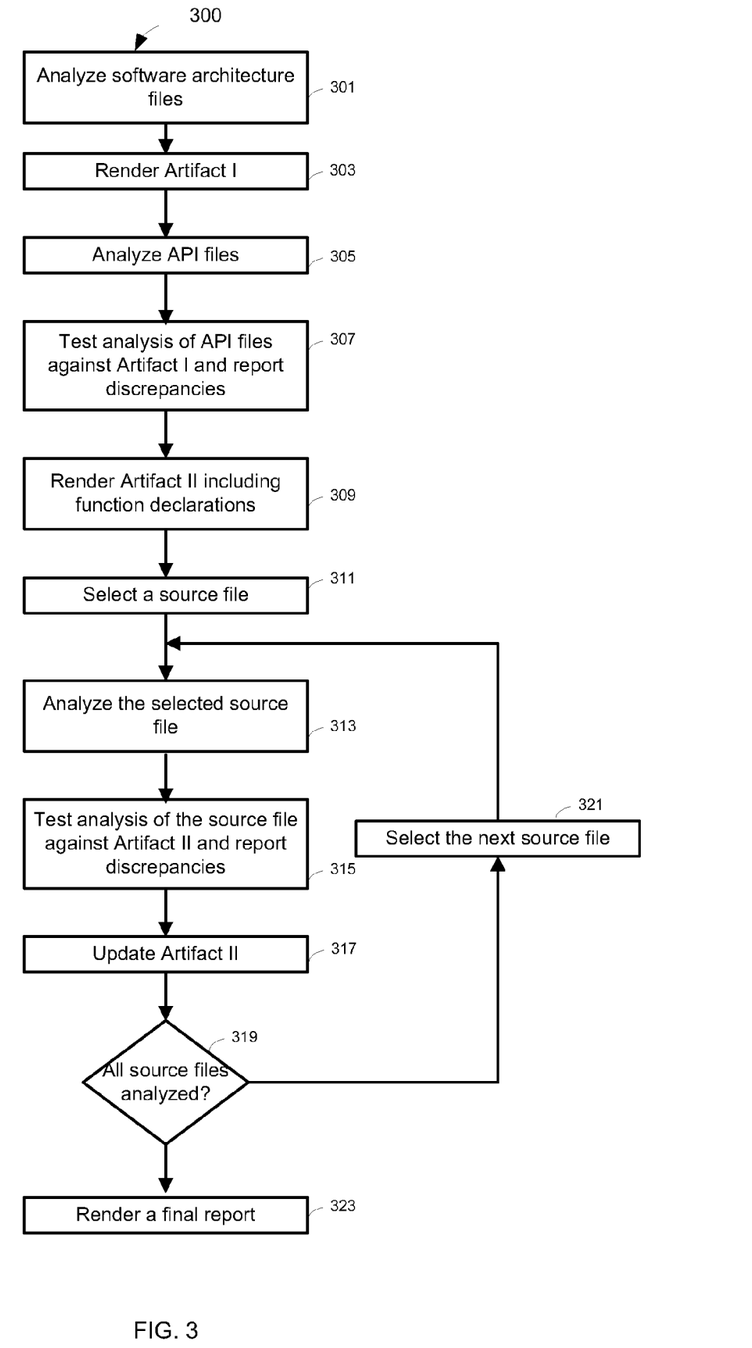
FIG. 3 illustrates a process of performing compliance checking in accordance with another provided embodiment.

With reference to FIG. 3, in the process 300, the steps 301-315 and 319-321 are the same as the corresponding steps in the process 200. In step 317, however, based on the analysis in the earlier steps, if a function declaration rendered in Artifact II is found within the scope of the analyzed file, whether or not any discrepancies exists, Artifact II is updated, e.g., the function declarations generated in step 309 are updated (e.g., annotated) to indicate that corresponding function implementation in the source code was identified. In the process 300, the step 223 of the process 200 is avoided. Instead, the function declaration in Artifact II is used as a check list, i.e., if one or more function declarations remain un-annotated after all source-code files have been analyzed, it is determined that one or more specified functionalities have not been implemented. Conversely, if a match is found again for an annotated function declaration in Artifact II, it is determined that a certain functionality has been implemented more than once.

These implementations may be redundant, or one or more of them may be inconsistent with the software architecture. A final report, including results of various analyses and comparisons, and any discrepancies identified, is rendered in step 323.

In processes 200, 300, various steps may be executed concurrently on multi-processor computers as separate execution threads. For example, one or more software-architecture files, one or more interface files, and/or one or more source-code files may be analyzed simultaneously. In the process 300, in order to avoid simultaneous updates to the same function declaration in Artifact II a locking mechanism for synchronization and for controlling write accesses may be used.

Although in processes 200 and 300 the software-architecture files are analyzed first, subsequently the APIs to be provided in the IDL format are analyzed, and the source-code files are analyzed finally, this order is illustrative only, and that other processing orders are within the scope of the invention. It should also be understood, that in some provided embodiments, during compliance testing files described in only two different formats, e.g., XML and C source code may be analyzed. In general, rendering an artifact and/or a report includes making the artifact/report available in computer memory or storing the artifact/report on a non-volatile memory such as a hard-disk drive, for subsequent use.

In general, a cross-format compliance testing analysis (e.g., as illustrated by processes 200, 300) is organized as a strategy that can be static or dynamic. It should be noted, however, that even under the dynamic strategy, the analysis is performed statically, i.e., using source files without requiring an executable software, in whole or in part. The strategy typically depends on one or more rules being tested, that may be described in the software specification/requirements and/or software architecture, or may be inferred in part or entirely therefrom, one or more types/formats of files being tested, and, in the case of a dynamic strategy, the results of a previous analysis.

A strategy is usually executed by constructing an information-dependency graph that specifies which analyses must be performed before other analysis, thereby directing the flow of information. The dependency graph is acyclic among analysis-file pairs, although it may require touching (i.e., analyzing) an individual file more than once. Under both static and dynamic strategies, the graph is finite.

For example, the order in which files having different formats are analyzed may depend on the nature of the test being performed. In one provided embodiment, the test is to ascertain that all functionalites/capabilities required according to the specification/software architecture are implemented, and, hence, the order chosen can be that described with reference to FIGS. 2 and 3. In another provided embodiment, the test to be performed is to ascertain that the source-code implementation only invokes the exceptions that are permitted by the specification and/or the software architecture. As such, a suitable exemplary order is an analysis of the source-code files first, followed by an analysis of the software architecture.

Under a particular strategy, by analyzing one or more files of a type/format, an artifact encapsulating the information derived from the analysis is obtained. That artifact may be stored in volatile computer memory (e.g., cache, RAM, etc.) or in non-volatile memory (e.g., hard disk, flash drive, CD, etc., for later use). The information derived from the analysis may be necessary to perform subsequent analysis, for example, such information may be compared with information derived from the analysis of files of other types/formats, or it may be used in a final presentation/report indicating that a compliance test was successful or that it failed. A counter example (e.g., as mismatched function declarations) may be provided in the report if a test fails.

Both static and dynamic strategies can be executed in partial-code mode (PCM), in which static analysis can be performed on partial code, i.e., code that missing dependent files or code blocks that would be necessary to actually compile and execute the code. In some provided embodiments, the artifacts and the final report share a common syntax (e.g., a single XML scheme) that makes them interchangeable and those artifacts and report may also be manipulated by a common set of functions.

Figure 4:
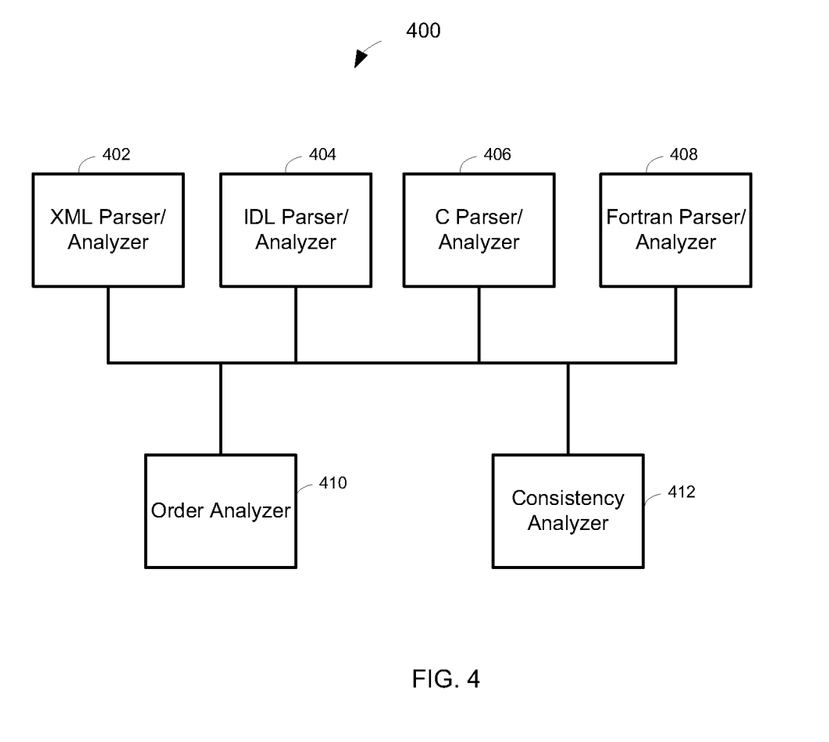
FIG. 4 schematically depicts a cross-platform analysis system according to a provided embodiment.

With reference to FIG. 4, in an exemplary cross-format analysis system 400 modules/files of different types are parsed/analyzed by various parsers/analyzers 402 (for XML files), 404 (for IDL files), 406 (for C files), 408 (for Fortran files). The order analyzer 410 determines the order in which the files are analyzed. The consistency analyzer 412 compares and/or consolidates the artifacts generated by the different parsers/analyzers 402-408. It should be understood that various components 402-412 of the system 400 are logical entities that may be implemented as different software modules or logical entities within one or more modules. The components 402-412 may be executed on the same computer or server, or on different processors, computers, or servers that may communicate with each other via a network. One or more of the components 402-412 may be executed concurrently, and/or any one component may be executed as parallel threads. For example, the parser 406 may comprise more than one C parsers, each simultaneously parsing a different C source-code file.

In general, the components 402-412 can be implemented in hardware (e.g., as integrated circuits, FPGAs, etc.), software, or combination thereof. Typically, the components implemented as software may be coded and implemented in any programming language, including, for example, C, C++, or JAVA™. The software components may be further translated into machine language or virtual machine instructions and stored in a program file in that form. The program file may then be stored on or in one or more computer-readable articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape.

If one or more of the components of the cross-format analysis system 400 are implemented, at least in part, in software, those software portions may be executed using any type of personal computer, Windows-based terminal, network computer, wireless device, information appliance, RISC Power PC, X-device, workstation, mini computer, main frame computer, personal digital assistant, set top box, hand-held device, or other computing device that is capable of both presenting information/data to, and receiving commands from, a user of the system 400. In general, a computer system implementing the cross-format analysis system 400 in hardware, software, or a combination thereof may include, for example, a visual display device (e.g., a computer monitor), a data entry device (e.g., a keyboard, a mouse, etc.), persistent and/or volatile storage (e.g., computer memory), and a processor.

In some provided embodiments, a commercially available consistency-checking tool (e.g., R-Check® SCA from Reservoir Labs Inc.) may be used to perform some of the steps in the processes 200, 300. In these embodiments, a separate parser tool may generate a summary report from all available files of each type/format such that the summary report includes all of the information determined to be relevant to cross-format analysis. These files may include files that describe specification/requirements/architecture of the software and/or configuration associated therewith. That information is available in each summary report as an intermediate representation. Once the summary reports (also called artifacts, typically one for each file type/format) are generated, R-Check® SCA may be executed, which may parse C and C++ source files into an intermediate representation. R-Check® SCA may also add to that representation the information contained in each of the file-type/format artifacts.

Generally, the file type/format artifacts (i.e., the summary reports) include only the information pertinent to cross-format testing (i.e., the information determined to be relevant) and, as such, the information in the artifacts may map nearly one-to-one to the information in the immediate representation. From this common, unified intermediate representation in memory, cross testing can be performed similarly as the single-format testing in R-Check® SCA, resulting in a unified summary report that may provide a cross-reference back to both the source code and to any line of interest in any file in any of the other formats.

EXAMPLES

The Joint Tactical Radio System (JTRS) family of software radios is being deployed with waveform application software specifically developed to the Software Communications Architecture (SCA), which references the POSIX® and CORBA® standards. In the examples below, various requirements of the SCA are considered.

The AP0100, 102, and 103 requirements of the SCA mandate the existence of a stop operation for each resource, and verification that the stop operation disables all current operations, puts the resource in a suspended state, and handles an exception that provides additional information describing the reason for the error and an error number of type CF::ErrorNumberType. To support evaluation of this requirement, given a list of resources (either extracted automatically from the code or provided as a configuration), the cross-format analysis system can identify the necessary stop operation and check the error number type automatically. The system may also provide a best-effort analysis to determine that the stop operation has the necessary semantics and exception support based on a built-in library of code patterns. Many cases can be verified automatically, though some others may require manual post-inspection. The resulting report discriminates between fully-checked cases and those requiring manual post-inspection. The latter set of cases is flagged in the report and accompanied by file and line numbers.

The AP0075, 76, and 78 requirements refer to the placement and use of releaseObject calls for CORBA components. To support evaluation of this requirement, the cross-format analysis system includes a selectable analysis for identifying, in context, use of the releaseObject function call. The system also provides a best-effort analysis to determine that the releaseObject operation has the necessary semantics and exception support based on a built-in library of code patterns. Many cases are verified automatically, while some others require manual post-inspection. The resulting report discriminates between fully-checked cases and those requiring manual post-inspection. The latter set of cases is flagged in the report and accompanied by file and line numbers.

The AP0609-11 requirements introduce support obligations in the Naming Service. The AP0063-65 requirements introduce support obligations in the CosEventComm PushConsumer. To support evaluation of these requirements, the cross-format analysis system includes a selectable analysis performing a search equivalent to the current JTEL grep-based test procedure, but with full context information about the use of each relevant keyword. This analysis is included in all generated reports, is configurable, and includes documentation. In the HTML reports, code lines are highlighted and designated as lines of interest.

The AP0614-15 requirements mandate descriptions of the interfaces used by a component in a Software Component Descriptor (SCD) XML file. To support evaluation of this requirement, the cross-format analysis system can parse and analyze, in context, the contents of SCD, Software Assembly Descriptor (SAD), and Software Package Descriptor (SPD), XML files. Parsing is based on a valid schema (not simple text grep). The analysis for AP0614 and AP0615 identifies ports designated as provides or uses in the SCD file. The output is a report formatted such that it can be synthesized by a suitable report generation tool. The analysis is configurable and includes documentation. In the HTML reports, syntax highlighting within the XML code will be supported.

The AP0608 requirement mandates that each component identified as implementing the Base Application Interfaces (Ports, LifeCycle, TestableObject, PropertySet, PortSupplier, Resource, or ResourceFactory) following the specifications identified in the SCA. Furthermore this requirement mandates that the interfaces implemented match the IDL signature in the SCA. To support evaluation of this requirement, the cross-format analysis system parses and analyzes IDL files for the purpose of extracting and summarizing interface specifications relevant to AP0608. These summaries are included as tests and then any mismatches between the IDL summary and the source code are identified as violations. Reports highlight the offending line of code and include, as a message, the source file and line of the mismatched IDL summary.

The AP0742 requirement mandates that all APIs implemented in a JTR set must have their interfaces generated through the use of an IDL. It also checks that APIs generated using methods other than the use of IDL must be documented in the service definition mapping format. To support evaluation of this requirement, the cross-format analysis system parses and analyzes IDL files for the purpose of extracting and summarizing interface specifications relevant to AP0742. Using these summaries interfaces defined but not specified in the IDL are identified as violations. This analysis can support, as an option, the ability to exempt interfaces defined though means other than the use of IDL. In the HTML reports, unspecified interface specifications are highlighted as violations.

One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A computer-implemented method for determining consistency of a software application, the method comprising:
   reading, in computer memory, a first module describing a first characteristic of the software application, at least a part of the first module having a first format and the first characteristic comprising at least one of: a software requirement, a software architecture, a software configuration, and a software implementation;
   reading, in computer memory, a second module describing a second characteristic of the software application, at least a part of the second module having a second format different from the first format, the second characteristic also comprising at least one of: a software requirement, a software architecture, a software configuration, and a software implementation, but being different from the first characteristic;
   extracting, by a processor, from at least a portion of the first characteristic, a first artifact that encapsulates information derived by analyzing at least a portion of the first characteristic and that describes at least one of a software application capability and a software application requirement;
   analyzing, by the processor, the second module to derive at least a portion of the second characteristic;
   comparing, by the processor, the first artifact and the derived portion of the second characteristic to determine if the at least a portion of the first characteristic, as expressed by the first artifact that encapsulates information derived by analyzing at least a portion of the first characteristic and that describes at least one of a software application capability and a software application requirement, is consistent with the derived portion of the second characteristic; and
   storing, in at least one of computer memory and nonvolatile storage, a result of the comparison as a second artifact,
   wherein the second characteristic comprises a set of requirements, and the comparing comprises annotating a requirement in the set if the requirement is determined to correspond to the information derived by analyzing at least a portion of the first characteristic; and
   wherein the annotating the requirement comprises locking the requirement thereby avoiding simultaneous updates to the requirement if the comparing the second characteristic and the information derived is performed simultaneously with comparing the second characteristic and information derived by analyzing another portion of the first characteristic.

2. The method of claim 1, wherein the first format comprises one or more of plain text, Extensible Markup Language (XML), JAVA Script Object Notation (JSON), and Unified Modeling Language (UML).

3. The method of claim 1, wherein the first module comprises one or more files.

4. The method of claim 1, wherein the first characteristic described by the first module comprises at least a partial software architecture describing a functionality to be provided by the software application.

5. The method of claim 4, wherein the first artifact comprises one or more application-program-interfaces (APIs) corresponding to the at least a partial software architecture.

6. The method of claim 1, wherein the second format comprises one or more of Interface Description Language (IDL), Simple Declarative Language (SDL), and proprietary distributed Component Object Model (DCOM).

7. The method of claim 1, wherein the second module comprises one or more files.

8. The method of claim 1, wherein the second characteristic described by the second module comprises a software configuration.

9. The method of claim 8, wherein the configuration comprises one or more APIs corresponding to at least a portion of a functionality to be provided by the software application.

10. The method of claim 1, wherein the second artifact comprises a portion of the first artifact that is consistent with the derived portion of the second characteristic.

11. The method of claim 1, wherein the second artifact comprises a portion of the first artifact that is not consistent with the derived portion of the second characteristic.

12. The method of claim 1, wherein the second artifact comprises at least a portion of a third characteristic of the software application.

13. The method of claim 12, wherein the third characteristic comprises at least a portion of a source-code implementation of the software application.

14. The method of claim 13, wherein a language of the source-code implementation comprises one or more of C, C++, JAVA language, Fortran, and Ada.

15. The method of claim 12, wherein the at least a portion of the third characteristic of the software application comprises one or more API function declarations.

16. The method of claim 15, wherein the one or more of the API function declarations comprises at least one of a function name, a function argument, and a function return type.

17. The method of claim 1, further comprising:
   reading, in computer memory, a third module comprising a file describing a part of a third characteristic of the software application, at least a part of the file having a third format;
   analyzing, by the processor, the file to derive at least a portion of the third characteristic, that corresponds to the file, from the part of the third characteristic described in the file;
   comparing, by the processor, the second artifact and the derived portion corresponding to the file to determine if the derived portion corresponding to the file is consistent with the second artifact; and
   storing, in the at least one of computer memory and nonvolatile storage, a result of the comparison of the second artifact and the derived portion corresponding to the file as a report corresponding to the file.

18. The method of claim 17, wherein the third format comprises one or more source-code languages.

19. The method of claim 18, wherein one of the one or more source source-code languages comprises one of C, C++, JAVA language, Fortran, and Ada.

20. The method of claim 17, wherein the part of the third characteristic described by the file comprises at least a portion of a source-code implementation of the software application.

21. The method of claim 17, wherein the report corresponding to the file comprises a portion of the second artifact that is consistent with the derived portion of the third characteristic corresponding to the file.

22. The method of claim 17, wherein the report corresponding to the file comprises a portion of the second artifact that is not consistent with the derived portion of the third characteristic corresponding to the file.

23. The method of claim 17, wherein the derived portion corresponding to the file comprises one or more API function declarations corresponding to at least a partial source-code implementation of the software application.

24. The method of claim 23, wherein the second artifact comprises one or more API function declarations.

25. The method of claim 17,
wherein the third module comprises a plurality of files, each file describing a part of a third characteristic of the software application; and
wherein the analyzing, comparing, and storing steps are repeated for each file in the third module, thereby generating a plurality of reports, each report corresponding to one file.

26. The method of claim 25, wherein the second artifact comprises a set of requirements, the method further comprising:
combining the report corresponding to each file to generate a combined report; and
analyzing the combined report to determine if each requirement in the set is satisfied exactly once.

27. The method of claim 17, the comparing the second artifact and the derived portion corresponding to the file comprises further annotating a requirement in the set if the requirement is determined to correspond to the derived portion corresponding to the file.

28. The method of claim 27, wherein the further annotating the requirement comprises locking the requirement thereby avoiding simultaneous updates to the requirement if the comparing the second artifact and the derived portion corresponding to the file is performed simultaneously with comparing the second artifact and a derived portion corresponding to another file.

29. The method of claim 17, wherein at least one of the second artifact and the report comprises a line identifier for a line in a file in at least one of the first, second, and third modules, the identified line being inconsistent with a software specification.

30. The method of claim 1, wherein a plurality of characteristics are associated with the software application, the method further comprising:
selecting a test to be performed to determine consistency; and
designating, based on the selected test, one characteristic from the plurality of characteristics as the first characteristic, and a another, different characteristic from the plurality of characteristics as the second characteristic.

31. The method of claim 30, wherein
the selected test to be performed is exception consistency,
the characteristic designated as the first characteristic comprises at least a portion of a source-code implementation of the software application; and
the characteristic designated as the second characteristic comprises at least a partial software architecture describing a functionality to be provided by the software application.

32. An apparatus, comprising:
a processor; and
a memory comprising processor executable instructions that, when executed by the processor, configure the apparatus to:
read, in the memory, a first module describing a first characteristic of the software application, at least a part of the first module having a first format and the first characteristic comprising at least one of: a software requirement, a software architecture, a software configuration, and a software implementation;
read, in the memory, a second module describing a second characteristic of the software application, at least a part of the second module having a second format different from the first format, the second characteristic also comprising at least one of: a software requirement, a software architecture, a software configuration, and a software implementation, but being different from the first characteristic;
extract, by the processor, from at least a portion of the first characteristic, a first artifact that encapsulates information derived by analyzing at least a portion of the first characteristic and that describes at least one of a software application capability and a software application requirement;
analyze, by the processor, the second module to derive at least a portion of the second characteristic;
compare, by the processor, the first artifact and the derived portion of the second characteristic to determine if the at least a portion of the first characteristic, as expressed by the first artifact that encapsulates information derived by analyzing at least a portion of the first characteristic and that describes at least one of a software application capability and a software application requirement, is consistent with the derived portion of the second characteristic; and
store, in at least one of the memory and a nonvolatile storage, a result of the comparison as a second artifact, wherein the second characteristic comprises a set of requirements, and for comparing, the instructions further program the processor to:
annotate a requirement in the set if the requirement is determined to correspond to the information derived by analyzing at least a portion of the first characteristic; and
lock the requirement thereby avoiding simultaneous updates to the requirement if the comparing the second characteristic and the information derived is performed simultaneously with comparing the second characteristic and information derived by analyzing another portion of the first characteristic.

33. The apparatus of claim 32, wherein the first format comprises one or more of plain text, Extensible Markup Language (XML), JAVA Script Object Notation (JSON), and Unified Modeling Language (UML).

34. The apparatus of claim 32, wherein the first module comprises one or more files.

35. The apparatus of claim 32, wherein the first characteristic described by the first module comprises at least a partial software architecture describing a functionality to be provided by the software application.

36. The apparatus of claim 35, wherein the first artifact comprises one or more application-program-interfaces (APIs) corresponding to the at least a partial software architecture.

37. The apparatus of claim 32, wherein the second format comprises one or more of Interface Description Language (IDL), Simple Declarative Language (SDL), and proprietary distributed Component Object Model (DCOM).

38. The apparatus of claim 32, wherein the second module comprises one or more files.

39. The apparatus of claim 32, wherein the second characteristic described by the second module comprises a software configuration.

40. The apparatus of claim 39, wherein the configuration comprises one or more APIs corresponding to at least a portion of a functionality to be provided by the software application.

41. The apparatus of claim 32, wherein the second artifact comprises a portion of the first artifact that is consistent with the derived portion of the second characteristic.

42. The apparatus of claim 32, wherein the second artifact comprises a portion of the first artifact that is not consistent with the derived portion of the second characteristic.

43. The apparatus of claim 32, wherein the second artifact comprises at least a portion of a third characteristic of the software application.

44. The apparatus of claim 43, wherein the third characteristic comprises at least a portion of a source-code implementation of the software application.

45. The apparatus of claim 44, wherein a language of the source-code implementation comprises one or more of C, C++, JAVA language, Fortran, and Ada.

46. The apparatus of claim 43, wherein the at least a portion of the third characteristic of the software application comprises one or more API function declarations.

47. The apparatus of claim 46, wherein the one or more of the API function declarations comprises at least one of a function name, a function argument, and a function return type.

48. The apparatus of claim 32, wherein the processor is further configured to:
   read, in the memory, a third module comprising a file describing a part of a third characteristic of the software application, at least a part of the file having a third format;
   analyze, by the processor, the file to derive at least a portion of the third characteristic, that corresponds to the file, from the part of the third characteristic described in the file;
   compare, by the processor, the second artifact and the derived portion corresponding to the file to determine if the derived portion corresponding to the file is consistent with the second artifact; and
   store, in the at least one of the memory and the nonvolatile storage, a result of the comparison of the second artifact and the derived portion corresponding to the file as a report corresponding to the file.

49. The apparatus of claim 48, wherein the third format comprises one or more source-code languages.

50. The apparatus of claim 49, wherein one of the one or more source source-code languages comprises one of C, C++, JAVA language, Fortran, and Ada.

51. The apparatus of claim 48, wherein the part of the third characteristic described by the file comprises at least a portion of a source-code implementation of the software application.

52. The apparatus of claim 48, wherein the report corresponding to the file comprises a portion of the second artifact that is consistent with the derived portion of the third characteristic corresponding to the file.

53. The apparatus of claim 48, wherein the report corresponding to the file comprises a portion of the second artifact that is not consistent with the derived portion of the third characteristic corresponding to the file.

54. The apparatus of claim 48, wherein the derived portion corresponding to the file comprises one or more API function declarations corresponding to at least a partial source-code implementation of the software application.

55. The apparatus of claim 54, wherein the second artifact comprises one or more API function declarations.

56. The apparatus of claim 48,
   wherein the third module comprises a plurality of files, each file describing a part of a third characteristic of the software application; and
   wherein the processor is configured to repeat analyzing, comparing, and storing for each file in the third module, thereby generating a plurality of reports, each report corresponding to one file.

57. The apparatus of claim 56, wherein the second artifact comprises a set of requirements, and the processor is further configured to:
   combine the report corresponding to each file to generate a combined report; and
   analyze the combined report to determine if each requirement in the set is satisfied exactly once.

58. The apparatus of claim 48, the configuration of the processor to compare comprises a further configuration of the processor to further annotate a requirement in the set if the requirement is determined to correspond to the derived portion corresponding to the file.

59. The apparatus of claim 58, wherein the configuration to further annotate the requirement comprises a further configuration of the processor to lock the requirement, thereby avoiding simultaneous updates to the requirement if the comparison of the second artifact and the derived portion corresponding to the file is performed simultaneously with another comparison comparing the second artifact and a derived portion corresponding to another file.

60. The apparatus of claim 48, wherein at least one of the second artifact and the report comprises a line identifier for a line in a file in at least one of the first, second, and third modules, the identified line being inconsistent with a software specification.

61. The apparatus of claim 32, wherein a plurality of characteristics are associated with the software application, and the apparatus is further configured to:
   select a test to be performed to determine consistency; and
   designate, based on the selected test, one characteristic from the plurality of characteristics as the first characteristic, and a another, different characteristic from the plurality of characteristics as the second characteristic.

62. The apparatus of claim 61, wherein
   the selected test to be performed is exception consistency,
   the characteristic designated as the first characteristic comprises at least a portion of a source-code implementation of the software application; and
   the characteristic designated as the second characteristic comprises at least a partial software architecture describing a functionality to be provided by the software application.

63. An article of manufacture, comprising a non-transitory machine-readable medium storing instructions that, when executed by a machine, configure the machine to:
   read, in machine memory, a first module describing a first characteristic of the software application, at least a part of the first module having a first format and the first characteristic comprising at least one of: a software requirement, a software architecture, a software configuration, and a software implementation;
   read, in the memory, a second module describing a second characteristic of the software application, at least a part of the second module having a second format different from the first format, the second characteristic also comprising at least one of: a software requirement, a software architecture, a software configuration, and a software implementation, but being different from the first characteristic;
   extract, by a processor, from at least a portion of the first characteristic, a first artifact that encapsulates information derived by analyzing at least a portion of the first characteristic and that describes at least one of a software application capability and a software application requirement;
   analyze, by the processor, the second module to derive at least a portion of the second characteristic;

compare, by the processor, the first artifact and the derived portion of the second characteristic to determine if the at least a portion of the first characteristic, as expressed by the first artifact that encapsulates information derived by analyzing at least a portion of the first characteristic and that describes at least one of a software application capability and a software application requirement, is consistent with the derived portion of the second characteristic; and store, in at least one of the machine memory and a nonvolatile storage, a result of the comparison as a second artifact, wherein the second characteristic comprises a set of requirements, and for comparing, the instructions further program the processor to:

annotate a requirement in the set if the requirement is determined to correspond to the information derived by analyzing at least a portion of the first characteristic; and lock the requirement thereby avoiding simultaneous updates to the requirement if the comparing the second characteristic and the information derived is performed simultaneously with comparing the second characteristic and information derived by analyzing another portion of the first characteristic.

64. The article of claim 63, wherein the first format comprises one or more of plain text, Extensible Markup Language (XML), JAVA Script Object Notation (JSON), and Unified Modeling Language (UML).

65. The article of claim 63, wherein the first module comprises one or more files.

66. The article of claim 63, wherein the first characteristic described by the first module comprises at least a partial software architecture describing a functionality to be provided by the software application.

67. The article of claim 66, wherein the first artifact comprises one or more application-program-interfaces (APIs) corresponding to the at least a partial software architecture.

68. The article of claim 63, wherein the second format comprises one or more of Interface Description Language (IDL), Simple Declarative Language (SDL), and proprietary distributed Component Object Model (DCOM).

69. The article of claim 63, wherein the second module comprises one or more files.

70. The article of claim 63, wherein the second characteristic described by the second module comprises a software configuration.

71. The article of claim 70, wherein the configuration comprises one or more APIs corresponding to at least a portion of a functionality to be provided by the software application.

72. The article of claim 63, wherein the second artifact comprises a portion of the first artifact that is consistent with the derived portion of the second characteristic.

73. The article of claim 63, wherein the second artifact comprises a portion of the first artifact that is not consistent with the derived portion of the second characteristic.

74. The article of claim 63, wherein the second artifact comprises at least a portion of a third characteristic of the software application.

75. The article of claim 74, wherein the third characteristic comprises at least a portion of a source-code implementation of the software application.

76. The article of claim 75, wherein a language of the source-code implementation comprises one or more of C, C++, JAVA language, Fortran, and Ada.

77. The article of claim 74, wherein the at least a portion of the third characteristic of the software application comprises one or more API function declarations.

78. The article of claim 77, wherein the one or more of the API function declarations comprises at least one of a function name, a function argument, and a function return type.

79. The article of claim 63, wherein the processor is further configured to:

read, in the memory, a third module comprising a file describing a part of a third characteristic of the software application, at least a part of the file having a third format;

analyze, by the processor, the file to derive at least a portion of the third characteristic, that corresponds to the file, from the part of the third characteristic described in the file;

compare, by the processor, the second artifact and the derived portion corresponding to the file to determine if the derived portion corresponding to the file is consistent with the second artifact; and store, in the at least one of the memory and the nonvolatile storage, a result of the comparison of the second artifact and the derived portion corresponding to the file as a report corresponding to the file.

80. The article of claim 79, wherein the third format comprises one or more source-code languages.

81. The article of claim 80, wherein one of the one or more source source-code languages comprises one of C, C++, JAVA language, Fortran, and Ada.

82. The article of claim 79, wherein the part of the third characteristic described by the file comprises at least a portion of a source-code implementation of the software application.

83. The article of claim 79, wherein the report corresponding to the file comprises a portion of the second artifact that is consistent with the derived portion of the third characteristic corresponding to the file.

84. The article of claim 79, wherein the report corresponding to the file comprises a portion of the second artifact that is not consistent with the derived portion of the third characteristic corresponding to the file.

85. The article of claim 79, wherein the derived portion corresponding to the file comprises one or more API function declarations corresponding to at least a partial source-code implementation of the software application.

86. The article of claim 85, wherein the second artifact comprises one or more API function declarations.

87. The article of claim 79,
wherein the third module comprises a plurality of files, each file describing a part of a third characteristic of the software application; and
wherein the processor is configured to repeat analyzing, comparing, and storing for each file in the third module, thereby generating a plurality of reports, each report corresponding to one file.

88. The article of claim 87, wherein the second artifact comprises a set of requirements, and the processor is further configured to:

combine the report corresponding to each file to generate a combined report; and analyze the combined report to determine if each requirement in the set is satisfied exactly once.

89. The article of claim 79, the configuration of the processor to compare comprises a further configuration of the processor to further annotate a requirement in the set if the requirement is determined to correspond to the derived portion corresponding to the file.

90. The article of claim 89, wherein the configuration to further annotate the requirement comprises a further configuration of the processor to lock the requirement, thereby avoiding simultaneous updates to the requirement if the comparison of the second artifact and the derived portion corresponding to the file is performed simultaneously with another comparison comparing the second artifact and a derived portion corresponding to another file.

91. The article of claim 79, wherein at least one of the second artifact and the report comprises a line identifier for a line in a file in at least one of the first, second, and third modules, the identified line being inconsistent with a software specification.

92. The article of claim 63, wherein a plurality of characteristics are associated with the software application, and the apparatus is further configured to:
   select a test to be performed to determine consistency; and
   designate, based on the selected test, one characteristic from the plurality of characteristics as the first characteristic, and a another, different characteristic from the plurality of characteristics as the second characteristic.

93. The article of claim 92, wherein
   the selected test to be performed is exception consistency,
   the characteristic designated as the first characteristic comprises at least a portion of a source-code implementation of the software application; and
   the characteristic designated as the second characteristic comprises at least a partial software architecture describing a functionality to be provided by the software application.

* * * * *